United States Patent
Ishimaru et al.

(10) Patent No.: US 12,030,288 B2
(45) Date of Patent: *Jul. 9, 2024

(54) POLYESTER-BASED FILM FOR KEEPING FRESHNESS AND PACKAGING BAG

(71) Applicant: TOYOBO CO., LTD., Osaka (JP)

(72) Inventors: Shintaro Ishimaru, Tsuruga (JP); Hiroko Maruyama, Tsuruga (JP); Tomoyuki Hashida, Osaka (JP); Masayuki Haruta, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 417 days.

This patent is subject to a terminal disclaimer.

(21) Appl. No.: 15/734,978

(22) PCT Filed: Jun. 4, 2019

(86) PCT No.: PCT/JP2019/022096
§ 371 (c)(1),
(2) Date: Dec. 3, 2020

(87) PCT Pub. No.: WO2019/239953
PCT Pub. Date: Dec. 19, 2019

(65) Prior Publication Data
US 2021/0229410 A1    Jul. 29, 2021

(30) Foreign Application Priority Data
Jun. 12, 2018   (JP) .................................. 2018-111641

(51) Int. Cl.
B32B 27/36    (2006.01)
B32B 7/04     (2019.01)
(Continued)

(52) U.S. Cl.
CPC .............. *B32B 27/36* (2013.01); *B32B 27/08* (2013.01); *B65D 65/40* (2013.01); *B65D 77/20* (2013.01);
(Continued)

(58) Field of Classification Search
None
See application file for complete search history.

(56) References Cited

U.S. PATENT DOCUMENTS 4,698,954 A    10/1987  Behr et al.
5,832,699 A *  11/1998  Zobel ..................... B65D 81/24
                                                    53/461

(Continued)

FOREIGN PATENT DOCUMENTS

EP    1541322 A2 *  6/2005
EP    2460414 A1 *  6/2012
(Continued)

OTHER PUBLICATIONS

China National Intellectual Property Administration, The First Office Action in Chinese Patent Application No. 201980037396.8 (dated Nov. 24, 2021).

(Continued)

*Primary Examiner* — Vivian Chen
(74) *Attorney, Agent, or Firm* — Leydig, Voit & Mayer, Ltd.

(57) ABSTRACT

The present invention provides a polyester-based film for keeping freshness, comprising a polyester-based resin layer comprising, ethylene terephthalate as a main component, wherein the polyester-based film satisfies the requirements (1) to (4); that can extend the shelf life of the contents such as fruits and vegetables when using as a packaging bag, increase a commodity value, and re-close even after the packaging bag opened.

(Continued)

(1) the film has an $O_2$-transmission rate of 50 [cc/($m^2 \cdot d \cdot atm$)] or more and 1000 [cc/($m^2 \cdot d \cdot atm$)] or less when measured at a temperature of 23° C. and a relative humidity of 65% RH, (2) the film has a $CO_2$-transmission rate of 200 [cc/($m^2 \cdot d \cdot atm$)] or more and 5000 [cc/($m^2 \cdot d \cdot atm$)] or less when measured at a temperature of 23° C.

(3) the film has a water vapor transmission rate of 20 [g/($m^2 \cdot d$)] or more and 400 [g/($m^2 \cdot d$)] or less when measured at a temperature of 40° C. and a relative humidity of 90% RH, and (4) the film has an angle after folding the film of 20° or more and 80° or less.

20 Claims, 1 Drawing Sheet

(51) Int. Cl.
    *B32B 27/08* (2006.01)
    *B32B 27/18* (2006.01)
    *B65D 65/40* (2006.01)
    *B65D 77/20* (2006.01)
    *B65D 81/24* (2006.01)
    *B65D 85/50* (2006.01)
    *C08J 5/18* (2006.01)

(52) U.S. Cl.
CPC ............... *B65D 81/24* (2013.01); *C08J 5/18* (2013.01); *B32B 7/04* (2013.01); *B32B 27/18* (2013.01); *B32B 2250/244* (2013.01); *B32B 2307/54* (2013.01); *B32B 2307/702* (2013.01); *B32B 2307/724* (2013.01); *B32B 2307/732* (2013.01); *B32B 2435/00* (2013.01); *B32B 2439/46* (2013.01); *B32B 2439/70* (2013.01); *B65D 85/50* (2013.01); *C08J 2367/02* (2013.01); *C08J 2467/02* (2013.01)

(56) References Cited

U.S. PATENT DOCUMENTS

| | | | | |
|---|---|---|---|---|
| 6,316,067 | B1* | 11/2001 | Edwards | B32B 7/12 428/476.3 |
| 6,746,762 | B1* | 6/2004 | Hosoda | C08J 5/18 428/332 |
| 10,766,237 | B2* | 9/2020 | Ishimaru | B32B 27/36 |
| 10,836,551 | B1* | 11/2020 | Mir | B65D 77/206 |
| 2003/0029850 | A1* | 2/2003 | Varriano-Marston | B65B 61/02 219/121.71 |
| 2005/0019595 | A1 | 1/2005 | Kim et al. | |
| 2005/0058791 | A1* | 3/2005 | Moehlenbrock | B32B 27/08 428/138 |
| 2010/0247725 | A1* | 9/2010 | Krijgsman | C08L 67/025 206/524.6 |
| 2011/0189356 | A1* | 8/2011 | Hanley | A23C 19/16 426/415 |
| 2016/0108171 | A1 | 4/2016 | Haruta et al. | |
| 2017/0355497 | A1 | 12/2017 | Hashida et al. | |
| 2019/0315107 | A1 | 10/2019 | Ishimaru et al. | |
| 2020/0163351 | A1* | 5/2020 | Vigano' | B65D 65/20 |
| 2021/0100260 | A1* | 4/2021 | Stafyla | B65D 75/00 |

FOREIGN PATENT DOCUMENTS

| | | | |
|---|---|---|---|
| JP | H02-028310 A | | 1/1990 |
| JP | H02-501563 A | | 5/1990 |
| JP | H07-005762 B2 | | 1/1995 |
| JP | H09-104091 A | | 4/1997 |
| JP | 2000-263705 A | | 9/2000 |
| JP | 2001-114912 A | * | 4/2001 |
| JP | 2001-146291 A | | 5/2001 |
| JP | 20001-146291 A | * | 5/2001 |
| JP | 2004-242504 A | * | 9/2004 |
| JP | 2005-178817 A | | 7/2005 |
| JP | 2005-193951 A | * | 7/2005 |
| JP | 2009-012481 A | | 1/2009 |
| JP | 2009-035327 A | | 2/2009 |
| JP | 4308662 B2 | | 8/2009 |
| JP | 2009-035327 A | * | 9/2009 |
| JP | 5007623 B2 | | 8/2012 |
| JP | 2014-196405 A | * | 10/2014 |
| JP | 2015-160375 A | | 9/2015 |
| JP | 2017-210541 A | * | 11/2017 |
| WO | WO 2001/010928 A1 | | 2/2001 |
| WO | WO 2018/003598 A1 | | 1/2018 |

OTHER PUBLICATIONS

Japanese Patent Office, International Search Report in International Patent Application No. PCT/JP2019/022096 (dated Aug. 20, 2019).

China National Intellectual Property Administration, Office Action in Chinese Patent Application No. 201980037396.8 (dated Jun. 9, 2022).

European Patent Office, Extended European Search Report in European Patent Application No. 19818724.7 (dated Feb. 17, 2022).

Indian Patent Office, First Examination Report in Indian Patent Application No. 202147000025 (dated Apr. 26, 2022).

China National Intellectual Property Administration, The First Office Action in Chinese Patent Application No. 201780040411.5 (dated Jun. 5, 2020).

Japanese Patent Office, International Search Report in International Patent Application No. PCT/JP2017/022661 (dated Sep. 26, 2017).

Korean Intellectual Property Office, Office Aciton in Korean Patent Application No. 10-2020-7037575 (Mar. 18, 2024).

U.S. Appl. No. 16/313,746, filed Dec. 27, 2018.

\* cited by examiner

POLYESTER-BASED FILM FOR KEEPING FRESHNESS AND PACKAGING BAG

CROSS-REFERENCE TO RELATED APPLICATIONS

This patent application is the U.S. national phase of International Patent Application No. PCT/JP2019/022096, filed Jun. 4, 2019, which claims the benefit of Japanese Patent Application No. 2018-111641, filed Jun. 12, 2018, which are incorporated by reference in their entireties herein.

TECHNICAL FIELD

The present invention relates to a film, a packaging bag comprising the film and a lid comprising the film. When the packaging bag is made from the film, the opening can be re-closed by twisting the opening, and the film is suitable for keeping the freshness of the object for packaging, especially suitable for keeping the freshness of fruits and vegetables.

BACKGROUND ART

Plastic films have conventionally been used as packaging materials for various articles, and objects to be packaged in the plastic films include a wide range of articles such as industrial products, foods, and pharmaceuticals. A packaging material not only prevents dirt from the outside, but also has the function of improving a design characteristic by packaging to increase consumers' purchasing inclinations and the function of extending the expiration date (shelf life) of contents.

When packaging a fruit or vegetable with the plastic films, water vapor evaporated from the fruit or vegetable itself shortens the shelf life. That is, water droplets adhering to the inside of a packaging bag cause the inside of the packaging bag to fog. As a result, not only the appearance as a commercial product is deteriorated but also the fruit or vegetable readily becomes rotten due to the generation of mold and the like.

Polyolefin-based films such as polypropylene film and polyethylene film can be mass-produced at low cost and so have been conventionally used preferably as packaging materials for fruits and vegetables. However, an olefin-based film has a low water vapor transmission rate and thus has a problem that, when used as a packaging bag, water droplets may easily adhere to the inside of the packaging bag. For example, Patent Literature 1 discloses that the deterioration of an appearance due to water droplets is solved by the presence of an antifogging agent on a surface layer of at least one side of the packaging bag. However, this technology is essentially unable to reduce the amount of water vapor inside the packaging bag and thus has fallen short of improving the shelf life.

Regarding the improvement of shelf life, the concept of Modified Atmosphere (MA) has been proposed. This concept is that active control of a gas environment in a packaging bag has the effect of regulating the breathing of fruits and vegetables and increasing the shelf life. For example, Patent Literature 2 proposes a technique capable of increasing the water vapor transmission rate of a film by providing pores in the film and suppressing the adhesion of water droplets when the film is used as a packaging bag. Patent Literature 2 describes that not only water vapor but also oxygen concentration and carbon dioxide concentration are greatly involved in the shelf life of fruits and vegetables, and Patent Literature 3 also describes a similar technical idea. However, when pores are formed in the film that forms the packaging bag, the water vapor transmission rate increases, and the transmission rates of oxygen and carbon dioxide also increase simultaneously. A state of low oxygen concentration and high carbon dioxide concentration (low-$O_2$ and high-$CO_2$ state) is preferable in the MA packaging, and transmission of oxygen and carbon dioxide through the pores is not necessarily suitable for packaging fruits and vegetables. Furthermore, there are problems that the provision of pores essentially reduces the stiffness and strength of the packaging bag, and in addition, the productivity of the packaging bag is lowered because a step of providing the pores is required.

Conversely, attempts have been made to extend the shelf life of fruits and vegetables by using materials other than polyolefins. For example, in the keeping-freshness material disclosed in Patent Literature 4, the transmission rates of water vapor, oxygen, and carbon dioxide are allowed to fall within a predetermined range by using an aliphatic polyester, and moreover, the ratio of the $O_2$-transmission rate and the $CO_2$-transmission rate is specified. However, in the examples described in Patent Literature 4, the ratio of the $CO_2$-transmission rate to the $O_2$-transmission rate is at least 6.7, and further reduction of the ratio of the $CO_2$-transmission rate to the $O_2$-transmission rate has been desired to extend the shelf life of fruits and vegetables. Furthermore, in Patent Literature 4, there is a problem that, in order to reduce the amount of cyclic dimers that bleed out of the aliphatic polyester, a long-time treatment such as washing and immersing polyester with an organic solvent or an alkaline aqueous solution is required, and thus the productivity of the aliphatic polyester may be lowered.

Furthermore, it is thought that ethylene gas is also involved in the shelf life of fruits and vegetables. Patent Literature 5 describes that by allowing an inorganic substance to be present in a polyester film, ethylene gas can be adsorbed on the film, and the shelf life can be extended. However, since the polyester resin and the inorganic substance constituting the film are incompatible with each other, there is a problem that the packaging bag is turbid in white (haze becomes high), resulting in the difficulty of visually recognizing the contents.

A packaging bag is often composed of two sides, a bottom, and an opening. Three directions of the sides and the bottom or two directions of the sides are usually sealed, and the opening is often open to take the contents in and out. Since a function as a packaging bag cannot be performed if the opening stays open, it is necessary to open and close the opening as needed. For example, Patent Literatures 6 and 7 propose a packaging bag structure that can be re-closed by providing a fastener or a zipper at the opening of the packaging bag. However, the number of process steps is increased for attaching such a closure implement during manufacturing a packaging bag, resulting in a reduction in productivity of the packaging bag. Furthermore, in recent years, with the increase in environmental awareness, a movement to improve recyclability is becoming active by composing a packaging material with a single type of material (so-called mono-material) as much as possible. Since the closure implement is often composed of a different material from the packaging bag, it may be difficult to achieve mono-material.

As described above, it has been demanded of the conventionally used olefin-based film to allow the water vapor transmission rate, $O_2$-transmission rate, and $CO_2$-transmission rate to fall within respective preferable ranges, but such a demand has not yet been realized. Furthermore, re-closing the olefin-based film by heat sealing is possible but requires a dedicated apparatus, and it is usually difficult for general consumers to perform the heat sealing. Therefore, a method for easily re-closing a packaging bag formed of an olefin-based film has not been proposed. Furthermore, Patent Literatures 4 and 5 do not mention at all the re-close property of a polyester-based film.

CITATION LIST

Patent Literature

Patent Literature 1: JP H02-28310 B
Patent Literature 2: JP 2001-146291 A
Patent Literature 3: JP 2000-263705 A
Patent Literature 4: JP 5007623 B
Patent Literature 5: JP H09-104091 A
Patent Literature 6: JP H02-501563 A
Patent Literature 7: JP 2005-178817 A

SUMMARY OF THE INVENTION

Problems to be Solved by the Invention

The present invention solves the problems of the above prior arts, and provides the film that can extend the shelf life of the contents such as fruits and vegetables when using as a packaging bag, increase a commodity value (appearance), and re-close even after the packaging bag opened.

Solution to the Problems

The constitutions of the present invention are as follows.
1. A polyester-based film for keeping freshness, comprising a polyester-based resin layer comprising ethylene terephthalate as a main component,
   wherein the polyester-based film satisfies the requirements (1) to (4):
   (1) the film has an $O_2$-transmission rate of 50 [cc/($m^2 \cdot d \cdot atm$)] or more and 1000 [cc/($m^2 \cdot d \cdot atm$)] or less when measured at a temperature of 23° C. and a relative humidity of 65% RH,
   (2) the film has a $CO_2$-transmission rate of 200 [cc/($m^2 \cdot d \cdot atm$)] or more and 5000 [cc/($m^2 \cdot d \cdot atm$)] or less when measured at a temperature of 23° C.,
   (3) the film has a water vapor transmission rate of 20 [g/($m^2 \cdot d$)] or more and 400 [g/($m^2 \cdot d$)] or less when measured at a temperature of 40° C. and a relative humidity of 90% RH, and
   (4) the film has an angle after folding the film of 200 or more and 800 or less.
2. The polyester-based film for keeping freshness according to the above 1, wherein the film has a ratio of the $CO_2$-transmission rate measured at a temperature of 23° C. and the $O_2$-transmission rate measured at a temperature of 23° C. and a relative humidity of 65% RH ($CO_2$-transmission rate/$O_2$-transmission rate) of 2 or more and 8 or less.
3. The polyester-based film for keeping freshness according to the above 1 or 2, wherein the film has a side-welded sealing strength of 5 N/15 mm or more and 60 N/15 mm or less.
4. The polyester-based film for keeping freshness according to any one of the above 1 to 3, wherein the film has a tensile modulus of 2000 MPa or more and 4500 MPa or less in the longitudinal direction or in the width direction.
5. The polyester-based film for keeping freshness according to any one of the above 1 to 4, wherein a thickness is 3 μm or more and 70 μm or less.
6. The polyester-based film for keeping freshness according to any one of the above 1 to 5, wherein
   the polyester-based resin layer comprising one or more monomer components except for ethylene terephthalate that may serve as amorphous components, and
   total amount of the monomer components is 12 mol % or more and 30 mol % or less among total monomer components contained in the polyester-based resin layer.
7. A laminate, comprising one or more the polyester-based films for keeping freshness according to any one of the above 1 to 6.
8. A packaging bag, comprising the polyester-based film for keeping freshness according to any one of the above 1 to 6 or the laminate according to the above 7.
9. A lid, comprising the polyester-based film for keeping freshness according to any one of the above 1 to 6 or the laminate according to the above 7.

Advantageous Effects of the Invention

The polyester-based film of the present invention has a low $O_2$-transmission rate transmission rate, a low $CO_2$-transmission rate, and a water vapor transmission rate within a predetermined range, thereby the film has a high dead-fold property. Therefore, when using as a packaging bag, the opening can be re-closed by simply twisting or folding the opening, and further the films can contribute to extending a shelf life of the contents such as fruits and vegetables and increasing a commodity value.

DESCRIPTION OF EMBODIMENTS

The present invention relates to a polyester-based film for keeping freshness, comprising
   a polyester-based resin layer comprising ethylene terephthalate as a main component,
   wherein the polyester-based film satisfies the requirements (1) to (4):
   (1) $O_2$-transmission rate measured at a temperature of 23° C. and a relative humidity of 65% RH is 50 [cc/($m^2 \cdot d \cdot atm$)] or more and 1000 [cc/($m^2 \cdot d \cdot atm$)] or less,
   (2) $CO_2$-transmission rate measured at a temperature of 23° C. is 200 [cc/($m^2 \cdot d \cdot atm$)] or more and 5000 [cc/($m^2 \cdot d \cdot atm$)] or less,
   (3) Water vapor transmission rate measured at a temperature of 40° C. and a relative humidity of 90% RH is 20 [g/($m^2 \cdot d$)] or more and 400 [g/($m^2 \cdot d$)] or less, and
   (4) Angle after folding the film is 200 or more and 800 or less.

Hereinafter, the characteristics, the constituent materials and the film formation conditions of polyester-based film of the present invention will be described.

1. Characteristics of the Polyester-Based Film

1.1. $O_2$-Transmission Rate

The polyester-based film of the present invention has an $O_2$-transmission rate of 50 [cc/(m²·d·atm)] or more and 1000 [cc/(m²·d·atm)] or less when measured at a temperature of 23° C. and a relative humidity of 65% RH. This is because oxygen concentration and carbon dioxide concentration in the packaging bag will change when the fruits and vegetables are put in the packaging bag made from the film. In the packaging bag, breathing of fruits and vegetables consumes oxygen and produces carbon dioxide. By controlling the $O_2$-transmission rate of the film within the above range, exchange of oxygen and outside is suppressed, thereby a low-$O_2$ and high-$CO_2$ state, which is suitable for MA packaging, can be easily formed. That suppresses the breathing of fruits and vegetables, leading to the extension of the shelf life.

It is not preferable if the $O_2$-transmission rate exceeds 1000 [cc/(m²·d·atm)], since the breathing of fruits and vegetables will increase and the discoloration will occur. Conversely, it is not preferable if the $O_2$-transmission rate falls under 50 [cc/(m²·d·atm)], since the inside of the packaging bag will become extremely a low-$O_2$ and high-$CO_2$ state to cause the gas damage (suffocation) of fruits and vegetables and easily releasing the odorous components. The $O_2$-transmission rate is preferably 100 [cc/(m²·d·atm)] or more and 950 [cc/(m²·d·atm)] or less, and more preferably 150 [cc/(m²·d·atm)] or more and 900 [cc/(m²·d·atm)] or less.

1.2. $CO_2$-Transmission Rate

The polyester-based film of the present invention has a $CO_2$-transmission rate of 200 [cc/(m²·d·atm)] or more and 5000 [cc/(m²·d·atm)] or less when measured at a temperature of 23° C. It is not preferable if the $CO_2$-transmission rate exceeds 5000 [cc/(m²·d·atm)], since the shelf life of the contents will be shortened. Conversely, it is not preferable if the $CO_2$-transmission rate falls under 200 [cc/(m²·d·atm)], since the shelf life of the fruits and vegetables will also be shortened. This is the same reason as described in 1.1. $O_2$-transmission rate. The $CO_2$-transmission rate is preferably 250 [cc/(m²·d·atm)] or more and 4950 [cc/(m²·d·atm)] or less, and more preferably 300 [cc/(m²·d·atm)] or more and 4900 [cc/(m²·d·atm)] or less.

1.3. Water Vapor Transmission Rate

The polyester-based film of the present invention has a water vapor transmission rate of 20 [g/(m²·d)] or more and 400 [g/(m²·d)] or less when measured at a temperature of 40° C. and a relative humidity of 90% RH. It is not preferable if the water vapor transmission rate exceeds 400 [g/(m²·d)], since the moisture in the packaging bag will be easily released to the outside when the fruits and vegetables are put in the packaging bag made from the film, causing to increase a transpiration of water from the fruits and vegetables. Conversely, it is not preferable if the water vapor transmission rate falls under 20 [g/(m²·d)], since a condensation will occur in the packaging bag due to the remaining water vapor released from the fruits and vegetables in the packaging bag, causing that molds and the like grow easily on fruits and vegetables. The water vapor transmission rate is preferably 25 [g/(m²·d)] or more and 395 [g/(m²·d)] or less, and more preferably 30 [g/(m²·d)] or more and 390 [g/(m²·d)] or less.

1.4. Angle after Folding the Film

The polyester-based film of the present invention has an angle after folding the film of 20° or more and 80° or less measured by the method described below. It is not preferable if the angle after folding the film exceeds 80°, since creases are hard to be formed by twisting or folding the opening when using as a packaging bag, causing that the opening cannot be re-closed. Conversely, the lower the angle after folding the film is, the better it is, however, the lower limit that can be covered by the present invention is 200. It is sufficiently preferable for practical use even if the angle after folding the film is 250 or more. The upper limit of the angle after folding the film is preferably 750, and more preferably 70°.

1.5. Ratio of the $CO_2$-Transmission Rate and the $O_2$-Transmission Rate

The polyester-based film of the present invention preferably has a ratio of the 1.2. $CO_2$-transmission rate and 1.1. $O_2$-transmission rate ($CO_2$-transmission rate/$O_2$-transmission rate) of 2 or more and 8 or less. It is not preferable if the ratio of the $CO_2$-transmission rate and the $O_2$-transmission rate exceeds 8, since it will be difficult to make the inside of the packaging bag in a low-$O_2$ and high-$CO_2$ state, causing to shorten the shelf life of the fruits and vegetables. Conversely, the lower the ratio of the $CO_2$-transmission rate and the $O_2$-transmission rate is, the better it is, since the inside of the packaging bag will easily become in a low-$O_2$ and high-$CO_2$ state. Considering the present technologies, the lower limit of the ratio of the $CO_2$-transmission rate and the $O_2$-transmission rate is 2. It is sufficiently preferable for practical use even if the lower limit of the ratio of the $CO_2$-transmission rate and the $O_2$-transmission rate is 3. The upper limit of the ratio of the $CO_2$-transmission rate and the $O_2$-transmission rate is preferably 7, more preferably 6, and further preferably 5 or less.

1.6. Side-Welded Sealing Strength

The polyester-based film of the present invention preferably has an average side-welded sealing strength of 5 N/15 mm or more and 60 N/15 mm or less. It is not preferable if the side-welded sealing strength falls under 5 N/15 mm, since the side-welded part will easily peel off when the contents are put in the packaging bag made from the film, causing to make the packaging bag easily broken. The side-welded sealing strength is preferably 6 N/15 mm or more, and more preferably 7 N/15 mm or more. The higher the side-welded sealing strength is, the better it is. Considering a current situation, the upper limit is 60 N/15 mm. It is sufficiently preferable for practical use even if the upper limit of the side-welded sealing strength is 55 N/15 mm. As described below, the packaging bag of the present invention is preferably produced by a side-welded method.

1.7. Tensile Modulus

The polyester-based film of the present invention preferably has a tensile modulus of 2000 MPa or more and 4500 MPa or less in the longitudinal direction or in the width direction. It is not preferable if the tensile modulus falls under 2000 MPa, since not only the stiffness will easily deteriorate when used as a packaging bag, but also the packaging bag may be easily torn. Additionally, if the tensile modulus falls under 2000 MPa, a tension applied to the film may cause a break of the film when unrolling the film from the film roll and side-welding. The tensile modulus is preferably 2100 MPa or more, and more preferably 2200 MPa or more. The higher the tensile modulus is, the better it is, since the stiffness or the mechanical strength will be improved when used as a packaging bag, leading to eliminate a breakage when producing the packaging bag. Since the film of the present invention, which is molecular designed, is difficult to exceed 4500 MPa, 4500 MPa is the upper limit. The film may satisfy the tensile modulus within the above range either in the longitudinal direction or in the width direction, and the film preferably satisfies the tensile modulus within the above range both in the longitudinal direction and in the width direction.

1.8. Thickness

The polyester-based film of the present invention preferably has a thickness of 3 µm or more and 70 µm or less. It is not preferable if the thickness of the film falls below 3 µm, since $O_2$-transmission rate, $CO_2$-transmission rate, or water vapor transmission rate will increase, causing to exceed the upper limit. Additionally, if the thickness of the film falls under 3 µm, stiffness or strength will be insufficient when using as a packaging bag. Conversely, it is not preferable if the thickness of the film exceeds 70 µm, since $O_2$-transmission rate, $CO_2$-transmission rate, or water vapor transmission rate will decrease, causing to fall under the lower limit. The thickness of the film is preferably 5 µm or more and 68 µm or less, more preferably 7 µm or more and 66 µm or less.

1.9. Haze

The polyester-based film of the present invention preferably has a haze of 1% or more and 10% or less. It is not preferable if the haze exceeds 10%, since a transparency of the film will deteriorate, causing a poor visibility of the contents when using as a packaging bag. The upper limit of the haze is more preferably 9% or less, and further preferably 8% or less. The lower the haze is, the better it is because of high transparency. However, considering the present technologies, the lower limit is 1%, and it is sufficiently preferable for practical use even if the haze is 2% or more.

1.10. Gloss

The polyester-based film of the present invention preferably has a gloss of 100% or more and 200% or less. The higher the gloss, the glossier the film. Thereby, an appearance of the contents is expected to increase a sense of luxury. when using as a packaging bag. The higher the gloss is, the better it is, however, considering the present technologies, the upper limit of the gloss is 200%. It is sufficiently preferable for practical use even if the gloss is 190%. Conversely, if the gloss falls under 100%, an appearance of the contents would fail a sense of luxury when using as a packaging bag, since the film is less glossy. The gloss is preferably 110% or more, and more preferably 120% or more.

1.11. Hot-Water Heat Shrinkage Percentage

The polyester-based film of the present invention preferably has a hot-water heat shrinkage percentage of 0% or more and 10% or less in both the width direction and the longitudinal direction when being treated in hot water of 80° C. for 10 seconds. It is not preferable if the hot-water heat shrinkage percentage exceeds 10%, since, when producing the packaging bag by heat-sealing the film, the appearance will deteriorate due to the waviness by shrinking the sealed part. The hot-water heat shrinkage percentage is preferably 9% or less, and more preferably 8% or less. Conversely, when the hot-water heat shrinkage percentage falls under 0%, it means that the film extends. In this case, as well as in the case of a high hot-water heat shrinkage percentage, it is not preferable since the packaging bag will not maintain an original shape thereof. Considering the present technologies, the lower limit of the hot-water heat shrinkage percentage is 0%. It is sufficiently preferable for practical use even if the hot-water heat shrinkage percentage is 1%.

2. Constituent Materials of Polyester-Based Film

2.1. Types of Monomers Constituting Polyester-Based Resin

A polyester-based resin for the present invention contains an ethylene terephthalate unit as a main component. The phrase "containing an ethylene terephthalate unit as a main component" refers to comprising 50 mol % or more of the ethylene terephthalate unit when the whole amount of constituent components is defined as 100 mol %.

Further, a polyester-based resin for the present invention contains one or more monomer components that may serve as amorphous components (hereinafter may be simply referred to as amorphous components) as components other than the ethylene terephthalate unit. This is because the presence of an amorphous component improves dead-fold properties and side-welded sealing strength of the film.

Examples of a monomer of a carboxylic acid component that may serve as an amorphous component include isophthalic acid, 1,4-cyclohexanedicarboxylic acid, and 2,6-naphthalenedicarboxylic acid.

Examples of a monomer of a diol component that may serve as an amorphous component include neopentyl glycol, 1,4-cyclohexanedimethanol, 2,2-diethyl-1,3-propanediol, 2-n-butyl-2-ethyl-1,3-propanediol, 2,2-isopropyl-1,3-propanediol, 2,2-di-n-butyl-1,3-propanediol, and hexanediol.

Among the amorphous components, isophthalic acid, neopentyl glycol, 1,4-cyclohexanedimethanol, and diethylene glycol are preferable. By the use of one or more of these amorphous components, the film becomes more amorphous, and it becomes easier to allow the film to have an angle (that can be kept) after folding the film of 800 or less and a side-welded sealing strength of 5N/15 mm or more. As the amorphous component, neopentyl glycol and/or 1,4-cyclohexanedimethanol are/is more preferably used, and neopentyl glycol is particularly preferably used.

The polyester-based resin may contain components (other components) other than ethylene terephthalate and amorphous components. Examples of other dicarboxylic acid components constituting the polyester may include aromatic dicarboxylic acids such as orthophthalic acid; and alicyclic dicarboxylic acids. However, the polyester-based resin does not contain a polycarboxylic acid having 3 or more valences (for example, trimellitic acid, pyromellitic acid, and anhydrides thereof) and aliphatic dicarboxylic acids such as succinic acid, adipic acid, azelaic acid, sebacic acid, and decanedicarboxylic acid, preferably.

Examples of other diol components constituting the polyester-based resin include long chain diols such as 1,4-butanediol, aliphatic diols such as hexanediol, and aromatic diols such as bisphenol A. However, it is preferable not to use a diol having 8 or more carbon atoms (for example, octanecliol, etc.), or a polyol having 3 or more valences (for example, trimethylolpropane, trimethylolethane, glycerin, diglycerin, etc.) as a polyester raw material.

As a component constituting the polyester-based resin, a polyester elastomer containing ε-caprolactone, tetramethylene glycol, or the like may be used. The polyester elastomer can be preferably used because of the effect of lowering the melting point of the film.

2.2. Content of Monomers Constituting Polyester-Based Resin

The polyester-based resin for the present invention may have the amount of the amorphous components of preferably 12 mol % or more, more preferably 13 mol % or more, and further preferably 14 mol % or more. The upper limit of the amount of the amorphous components is preferably 30 mol %, more preferably 29 mol % or less, and further preferably 28 mol % or less. The amount of the amorphous components here refers to the total amount of the carboxylic acid monomer components or the diol monomer components that may serve as amorphous components. This is because one unit of an ester component (one unit in which a carboxylic acid monomer and a diol monomer are bonded by an ester bond) can be regarded as amorphous when either of the acid component and the diol component is a monomer that may serve as an amorphous component.

When the amount of the amorphous components falls under 12 mol %, even if the molten resin is solidified by quenching after being extruded from a die, the molten resin may crystallize in a subsequent stretching step and a final heat treatment step. As a result, the film becomes hard to melt at the time of welding, and it becomes difficult to produce a film having an angle after folding of 800 or less and a side-welded sealing strength of 5 N/15 mm or more.

When the total amount of the amorphous components exceeds 30 mol %, folding and side-welded sealing of the film can be easily conducted, but the shrinkage ratio of the film exceeds 10% even if the final heat treatment temperature described later is raised. When the amount of the amorphous components is within the above range, good dead-fold properties and side-welded sealing strength, and non-heat-shrinkable properties of the film can be ensured.

The polyester-based resin for the present invention may have the amount of the ethylene terephthalate unit of preferably 50 mol % or more and 88 mol % or less, and more preferably 55 mol % or more and 83 mol % or less in 100 mol % of the constituent units of the polyester-based resin. If the amount of the ethylene terephthalate unit falls under 50 mol %, mechanical strength and heat resistance of the film may become insufficient. Conversely, if the amount of the ethylene terephthalate unit exceeds 88 mol %, the amount of the amorphous components contained in the film may become relatively small, and it becomes difficult to conduct an appropriate side-welded sealing.

2.3. Other Components

If necessary, the resin constituting the polyester-based film of the present invention may contain various additives such as a wax, an antioxidant, an antistatic agent, a crystal nucleating agent, a viscosity reducing agent, a thermal stabilizer, a coloring pigment, an anti-coloring agent, and an ultraviolet absorber. Furthermore, the resin may contain fine particles as a lubricant for improving slipperiness of the film. As the fine particles, those of an arbitrary substance may be used. Examples of inorganic fine particles may include silica, alumina, titanium dioxide, calcium carbonate, kaolin, barium sulfate. Examples of organic fine particles may include acrylic resin particles, melamine resin particles, silicone resin particles, cross-linked polystyrene particles. The average particle size of the fine particles may be appropriately selected within a range of 0.05 µm to 3.0 µm (when measured by Coulter counter) as needed.

A method of blending the above fine particles in the resin constituting the polyester-based film is not particularly limited, and for example, the fine particles may be added at an arbitrary stage in the production of the polyester-based resin. As to the stage of adding the fine particles, for example, a slurry of the fine particles dispersed in ethylene glycol or the like can be added at a stage of esterification or at a stage after completion of ester exchange reaction and before start of polycondensation reaction, and then polycondensation reaction can be advanced. Further, examples of the blending method may also include a method in which a slurry of fine particles dispersed in ethylene glycol, water, or other solvent and raw materials of polyester-based resin are mixed using a kneading extruder with a vent, and a method in which dried fine particles and raw materials of polyester-based resin are mixed using a kneading extruder.

3. Film Formation Conditions of Polyester-Based Film 3.1. Melt Extrusion

The polyester-based film of the present invention can be produced by melt-extruding the polyester-based resin described in the above section "2. Constituent Materials of Polyester-Based Film" using an extruder to form an unstretched film and subjecting the unstretched film to a prescribed method described below. The film may be not stretched, and when the film is stretched, either uniaxial stretching or biaxial stretching may be used. From the viewpoints of $O_2$-transmission rate, $CO_2$-transmission rate, water vapor transmission rate, tensile modulus, and productivity of the film, the film produced by biaxial stretching is preferable. The polyester-based resin is produced by selecting kinds and amounts of a dicarboxylic acid component and a diol component so as to contain an appropriate amount of monomers that may serve as amorphous components as described above and conducting polycondensation of the selected components. As a raw material of the film, chip-shaped polyester-based resin produced by conducting polycondensation in advance may be used singly or in combination of two or more kinds.

When a raw material resin is melt-extruded, the polyester-based resin may be preferably dried using a dryer such as a hopper dryer and a paddle dryer, or a vacuum dryer. The polyester raw material is dried as described above, then melted at a temperature of 200 to 300-C and extruded into a film by using an extruder. At the extrusion, an arbitrary conventional method such as a T-die method and a tubular method can be used.

Subsequently, the film that is molten through extrusion can be quenched to produce an unstretched film. As a method of quenching the molten resin, a method in which a molten resin is cast on a rotary drum from a die to quench and solidify the cast resin to produce a substantially unoriented resin sheet can be suitably used. The film is preferably stretched in at least one direction of lengthwise (longitudinal) direction and transverse (width) direction (that is, uniaxial stretched film or biaxial stretched film). Below described is a sequential-biaxial stretching method by transverse stretching-lengthwise stretching that first performs a transverse stretching and next performs a lengthwise stretching. This order may be reversed to perform lengthwise stretching-transverse stretching because the main orientation direction is merely changed. The stretching method may also be a simultaneous biaxial stretching method.

3.2. First (Transverse) Stretching

The unstretched film produced by quenching after melt extrusion is stretched in the transverse direction with holding both ends in the width direction of the film by clips in a tenter (first tenter). The conditions of transverse stretching are preferably a stretch ratio of about 3 to 5 times and a temperature at 65° C. to 100° C. If the stretching temperature is lower than 65° C., the orientation crystallization of the film by transverse stretching is promoted, and thus the film may easily break in not only transverse stretching but also lengthwise stretching in the subsequent process. Conversely, if the transverse stretching temperature is higher than 100° C., the film may have a thickness irregularity in the width direction exceeding 18%. Prior to the transverse stretching, it is preferred to conduct preheating until a surface temperature of the film reaches 60° C. to 100° C.

If the transverse stretch ratio is lower than 3 times, the film tends to have a thickness irregularity in the width direction exceeding 18%. In addition, breakage may occur in the final heat treatment step described later. If the transverse stretch ratio is less than 3 times, stretching is hard to propagate to the edges of the film (at the edges of the clips), and the edge portions of the film that are not stretched (so-called, portions left unstretched) may become large. The edge portions of the film, where the portions left unstretched have occurred, have a lower degree of molecule orientation and have a significantly lower elastic modulus than that in the center of the film. Therefore, a heat shrinkage stress in the width direction generated in the final heat treatment step is concentrated in the vicinity of the portions left unstretched, whereby the thickness (resin volume) in the vicinity of the portions left unstretched moves toward the center in the width direction of the film. As a result, the thickness of the edges in the width direction of the film sharply decreases, and the film decreases in strength and may be broken.

After the transverse stretching, the film is preferably passed through an intermediate zone in which no aggressive heating operation is carried out. When there is a difference in temperature between a transverse stretching zone of the first tenter and an intermediate heat treatment zone, heat (hot air itself or radiant heat) of the intermediate heat treatment zone described later flows into the transverse stretching step, and a temperature of the transverse stretching zone may be not stabilized to cause unstable film quality. Thus, the film after the transverse stretching and before the intermediate heat treatment may be preferably passed through the intermediate zone over a prescribed time and then fed to the intermediate heat treatment zone. In this intermediate zone, hot air from the transverse stretching zone and hot air from the intermediate heat treatment zone are blocked such that, when a strip-shaped paper piece is hung down in a state where a film is not passed through the intermediate zone, the paper piece hangs down almost completely in the vertical direction, whereby a film with stable quality can be produced. For a passing time through the intermediate zone, about 1 second to 5 seconds is sufficient. If the passing time is shorter than 1 second, the length of the intermediate zone becomes insufficient, resulting in an insufficient blocking effect of hot air. Conversely, if the passing time is too long, although the longer the more preferred, equipment should become large. Therefore, about 5 seconds is sufficient for the passing time.

3.3. Intermediate Heat Treatment

After passed through the intermediate zone, the film is subjected to an intermediate heat treatment before lengthwise stretching. This intermediate heat treatment allows a shrinkage ratio in the width direction to be reduced. Controlling the temperature of the intermediate heat treatment in the range from the same temperature as the transverse stretching temperature to the transverse stretching temperature+30° C. can reduce the shrinkage ratio in the width direction. The temperature of the intermediate heat treatment is preferably in the range from the same temperature as the transverse stretching temperature to the transverse stretching temperature+30° C. If the temperature of the intermediate heat treatment zone is lower than the transverse stretching temperature, the effect of reducing a shrinkage ratio in the transverse direction is less likely to be exhibited. Conversely, if the temperature of the intermediate heat treatment zone is higher than the transverse stretching temperature+30° C., a shrinkage ratio in the width direction becomes lower, but the film may crystallize too much. As a result, it may be difficult to perform a subsequent stretching in the lengthwise direction. A passing time through the intermediate heat treatment zone is preferably 2 to 20 seconds. If the passing time is shorter than 2 seconds, the length of the intermediate heat treatment zone may be insufficient and it may be difficult to adjust a heat-shrinkage ratio in the width direction. The longer the passing time through the intermediate heat treatment zone, the more preferred, but about 20 seconds is sufficient. Thus, a transversely uniaxially-stretched film can be produced.

In the intermediate heat treatment, it is also possible to conduct a relaxation treatment by shortening a distance between the clips of the first tenter at an arbitrary ratio. The relaxation treatment allows molecules oriented in the transverse direction to relax without crystallization, and a shrinkage ratio in the width direction can be thus reduced. The relaxation ratio after transverse stretching can be arbitrarily set in the range of 0% (relaxation ratio 0% means that relaxation is not conducted) to 20%. If the relaxation ratio is higher than 20%, the orientation of the edges (the edge portions of the film) is too relaxed and the elastic modulus is lowered, which may cause breakage of the film in the final heat treatment step as described above.

3.4. Second (Lengthwise) Stretching

Subsequently, lengthwise stretching is performed. In a lengthwise stretching step, the transversely uniaxially-stretched film is first introduced into a lengthwise stretching machine in which a plurality of rolls is continuously disposed. In the lengthwise stretching, the film is introduced into the lengthwise stretching machine by a preheating roll. In the lengthwise stretching, it is preferred to preheat the film on the preheating roll until a film temperature reaches 65° C. to 110° C. The film temperature lower than 65° C. tends to make a stretching in the lengthwise direction difficult (that is, breakage tends to occur). Conversely, the temperature higher than 110° C. tends to make the film liable to stick to a roll, and the roll may be contaminated at an early stage in a successive production.

A lengthwise stretching is performed when the film temperature reaches the above range. The lengthwise stretching is performed by a difference in rotation speed between the rolls. A lengthwise stretch ratio is preferably 1.5 times to 5 times. A lengthwise stretch ratio is preferably 1.5 times to 5 times. At this time, not only one-stage stretching with two rolls of low speed and high speed can be used for stretching, but the number of stretching stages can also be increased as follows: two-stage stretching with three rolls of low speed, medium speed, and high speed, or three-stage stretching with four rolls of low speed, medium low speed, medium high speed, and high speed.

After the lengthwise stretching, a shrinkage in the longitudinal direction of the film, caused by the lengthwise stretching, may be reduced by relaxing the film in the longitudinal direction (relaxation in the longitudinal direction). A relaxation ratio in the longitudinal direction is preferably 0% or more and 70% or less (relaxation ratio 0% means that relaxation is not conducted). Since the upper limit of the relaxation ratio in the longitudinal direction is determined depending on materials to be used or conditions of the lengthwise stretching, relaxation cannot be conducted beyond the upper limit. In the polyester-based film of the present invention, the upper limit of the relaxation ratio in the longitudinal direction is 70%. Relaxation in the longitudinal direction may be carried out by heating the film after the lengthwise stretching at a temperature of 65° C. to 100° C., and controlling the difference in rotation speed between the rolls. As a means of the heating, any of a roll, a near infrared ray, a far infrared ray, a hot air heater, and the like can be used. The relaxation in the longitudinal direction is not necessarily carried out immediately after the lengthwise stretching and can be also carried out during the final heat treatment by shortening a distance between the clips in the longitudinal direction as described later. Conditions such as temperature and relaxation ratio will be described later.

After the relaxation in the longitudinal direction (after the lengthwise stretching if the relaxation is not conducted), the film is preferably cooled once, preferably on a cooling roll having a surface temperature of 20° C. to 40° C.

3.5. Final Heat Treatment

Next, the film after lengthwise stretching and cooling is introduced into the second tenter to conduct a final heat treatment and relaxation treatment at the same time. Since the lengthwise and transverse shrinkage ratios can be adjusted in the final heat treatment, it is a preferred embodiment to carry out the final heat treatment step after stretching the film. Relaxation in the second tenter can be conducted at an arbitrary ratio in each of the lengthwise and transverse directions. Relaxation in each of the lengthwise and transverse directions can be conducted by shortening a distance between the clips in each direction. The relaxation ratio is preferably 0% to 50% in each of the lengthwise and transverse directions. The lower limit of the relaxation ratio is 0%. Too high relaxation ratio is not preferable since there is also a disadvantage that the production speed and the product width of the film are lowered. Accordingly, the upper limit of the relaxation ratio is preferably about 50%.

The heat treatment (relaxation treatment) temperature is preferably 120° C. to 180° C. When the heat treatment temperature is lower than 120° C., it becomes difficult to reduce the shrinkage ratio of the film to 10% or less. Conversely, the higher the heat treatment temperature, the more the shrinkage ratio of the film can be preferably reduced. However, when the heat treatment temperature is higher than 180° C., not only a haze tends to exceed 10%, but also, as described above, the thickness of the edges in the width direction of the film decreases, and thus breakage may occur. Further, when the final heat treatment temperature is higher than 180° C., if the film comes into contact with the inside of the tenter, the film may stick thereto, resulting in a significant reduction in productivity.

After the final heat treatment, the film is wound while both ends of the film are cut and removed to thereby produce a polyester-based film roll.

The polyester-based film produced as described above may be subjected to a surface treatment step of imparting various characteristics to a film surface before being wound into a film roll or after being wound once into a film roll. Examples of such surface treatment include corona treatment and flame treatment for improving an adhesive property of a film surface, and coating treatment for imparting antistatic performance and antifog performance. These treatments can improve adhesive property, antistatic property, and antifogging property.

4. Laminate Comprising the Polyester-Based Film

The polyester-based film of the present invention may be used alone, or may be also used as a laminate by laminating other materials. A laminate of the present invention may comprise at least one of the polyester-based film. Thereby, the laminate will have characteristics discussed above such as the $O_2$-transmission rate, the $CO_2$-transmission rate, the water vapor transmission rate, the ratio of the $CO_2$-transmission rate and the $O_2$-transmission rate, the angle after folding the film, or the side-welded sealing strength.

The other layer comprised in the laminate is exemplified by a non-oriented film comprising polyethylene terephthalate as a constituent; a non-oriented, uniaxially-oriented or biaxially-oriented film comprising other amorphous polyesters as a constituent; a non-oriented, uniaxially-oriented or biaxially-oriented film comprising nylon as a constituent; a non-oriented, uniaxially-oriented or biaxially-oriented film comprising polypropylene as a constituent; a non-oriented, uniaxially-oriented or biaxially-oriented film comprising polyethylene as a constituent. Other layers are not limited to them.

In the laminate, the position where the polyester-based film of the present invention exists is not particularly limited. The polyester-based film of the present invention preferably exists at an innermost layer (a surface coming into contact with fruits and vegetables) when using as a packaging bag. This constituent will exhibit an excellent dead-fold properties and side-welded property.

The method for producing the laminate is not particularly limited, and conventionally known methods for producing the laminate such as a coating method, a coextruding method, a laminating method, or a heat-sealing method may be used.

5. Packaging Bag Comprising the Polyester-Based Film

The polyester-based film or the laminate of the present invention, which have the above characteristics, can be suitably used as a packaging bag. The packaging bag may comprise the polyester-based film or the laminate of the present invention as at least a part thereof. To control the $O_2$-transmission rate, the $CO_2$-transmission rate, and water vapor transmission rate of the packaging bag within a preferable range, the entire area of the packaging bag is preferably made from the polyester-based film or the laminate of the present invention.

The method for producing the packaging bag comprising the polyester-based film or the laminate of the present invention is not particularly limited, and may be exemplified by conventionally-known producing methods such as a heat-sealing method using a heated bar (heat-jaws), a side-welding method using a heated blade, an adhesive method by hot-melt, and a center sealing method by solvent. Among them, a heat-sealing method and a side-welding method is preferable, and a side-welding method is more preferable for producing the packaging bag.

The packaging bag comprising the polyester-based film or the laminate of the present invention can be closed by simply twisting the opening, thereby the exchange of gas and outside can be suppressed. The packaging bag preferably has a twisted angle of the opening of 720° (2 rounds) or more. At the time, the packaging bag preferably has a returned angle of lower than 4500, since the packaging bag can be closed. Setting the twisted angle of the opening to 720° or more is preferable, since the packaging bag will be closed more tightly. However, 720° is enough for preventing the packaging bag from being torn. It is not preferable if the returned angle after twisting the opening is 4500 or more because of a not enough closing effect.

The packaging bag comprising the polyester-based film or the laminate of the present invention may be preferably used as a packaging bag for fruits and vegetables.

Furthermore, the polyester-based film or the laminate of the present invention may be used as a lid of a container for keeping the freshness of the contents.

6. Contents

Examples of contents to be placed in a packaging bag using the polyester-based film or the laminate of the present invention include all vegetables including legumes, grains and herbs such as broccoli, Japanese mustard spinach, rape plant, bean sprout, green onion, tomato, green pea, green bean, spinach, Japanese mustard spinach, crown daisy, green shiso, chestnut, Chinese leek, green onion, parsley, Japanese mustard green, bell pepper, cucumber, bitter melon, eggplant, green asparagus, white asparagus, Japanese ginger, soybean sprout, radish sprout, Chinese cabbage, cabbage, carrot, pumpkin, lettuce, paprika, onion, Chinese yam, radish, turnip, corn, and potato; mushrooms such as shiitake mushroom, mushroom, nameko mushroom, shimeji mushroom, enokitake mushroom, *eryngii*, maitake mushroom, matsutake mushroom, and green soybean; fruits such as sudachi, kabosu, grape, melon, cherry, strawberry, persimmon, kiwifruit, cherry, green ume, pear, apple, banana, peach, loquat, blueberry, and watermelon; flowering plants such as rose, carnation, *chrysanthemum*, calla lily, lily, cherry blossom, peach, ume, freesia, armeria, sweet pea, *hydrangea*, surfinia, and dahlia; fish such as salmon, flounder, flatfish, yellowtail, saury, sardine, mackerel, octopus, squid, sea bream, splendid alfonsino, tuna, halfbeak, cutlass fish, flying fish, conger eel, and eel; shellfishes such as ark shell, clam, short-neck clam, shijimi clam, scallop, and aoyagi clam; and meats such as pork, beef, chicken and mutton. Among these contents, the packaging bag of the present invention can be used preferably for vegetables and fruits, and further preferably for broccoli, lettuce, green onion, cabbage, shiitake mushroom, and shimeji mushroom. The contents with a non-edible part such as a skin or branch remaining attached may be placed in a packaging bag, or the contents with a non-edible part removed and an edible part in a cut state, or the contents with a non-edible part remaining attached and an edible part in a cut state may be placed in a packaging bag.

EXAMPLES

Next, the present invention will be specifically described with reference to Examples and Comparative examples, but the present invention is not limited to the aspects of the Examples at all, and can be appropriately modified within the scope not departing from the gist of the present invention.

The method for evaluating a laminate is as follows. If the longitudinal direction and the width direction cannot be determined immediately due to the small area of the laminate and the like, a temporary longitudinal direction and a temporary width direction can be determined for measurement. Even if the temporary longitudinal direction and the temporary width direction differ by 900 with respect to the true direction, there is not particular problem.

<Preparation of Polyester Raw Material>

Synthetic Example 1

Into a stainless steel autoclave equipped with a stirrer, a thermometer and a partially circulating cooler were charged 100 mol % of dimethyl terephthalate (DMT) as a dicarboxylic acid component and 100 mol % of ethylene glycol (EG) as a polyol component such that the amount of ethylene glycol was 2.2 times the amount of dimethyl terephthalate in terms of the molar ratio, and using 0.05 mol % (based on the acid component) of zinc acetate as an ester exchange catalyst, an ester exchange reaction was carried out while distilling away generated methanol to outside the system. Thereafter, 0.225 mol % (based on the acid component) of antimony trioxide was added as a polycondensation catalyst, and a polycondensation reaction was carried out at 280° C. under a reduced pressure of 26.7 Pa to produce polyester A having an intrinsic viscosity of 0.75 dl/g. This polyester A is polyethylene terephthalate. The composition of polyester A is shown in Table 1.

Synthetic Example 2

In the same procedures as in Synthetic Example 1, polyesters B to G were produced, with changing the monomer.

Table 1 shows the composition of each polyester. In Table 1, TPA represents terephthalic acid, IPA represents isophthalic acid, BD represents 1,4-butanediol, NPG represents neopentyl glycol, CHDM represents 1,4-cyclohexane dimethanol, and DEG represents diethylene glycol. In the production of the polyester G, $SiO_2$ (Silysia 266 manufactured by Fuji Silysia Chemical Ltd.) was added as a lubricant in a proportion of 7,000 ppm relative to the polyester. Each polyester was appropriately formed into a chip shape. The compositions of the polyesters B to G are shown in Table 1.

TABLE 1

| Polyester raw material | Composition of polyester raw material (mol %) | | | | | | | Added amount of lubricant (ppm) |
|---|---|---|---|---|---|---|---|---|
| | Carboxylic acid component | | Diol component | | | | | |
| | TPA | IPA | EG | BD | NPG | CHDM | DEG | |
| A | 100 | 0 | 99 | 0 | 0 | 0 | 1 | 0 |
| B | 100 | 0 | 68 | 0 | 30 | 0 | 2 | 0 |
| C | 100 | 0 | 70 | 0 | 22 | 0 | 8 | 0 |
| D | 100 | 0 | 67 | 0 | 0 | 30 | 3 | 0 |
| E | 100 | 0 | 0 | 100 | 0 | 0 | 0 | 0 |
| F | 85 | 15 | 99 | 0 | 0 | 0 | 1 | 0 |
| G | 100 | 0 | 99 | 0 | 0 | 0 | 1 | 7000 |

[Film 1]

The polyesters A, B, E, and G were mixed in a mass ratio of 10:75:10:5, and the mixed polyester was charged into a biaxial screw extruder, melted and mixed at 270° C., extruded from a T-die, and then quenched on a chill roll set at a surface temperature of 30° C. to produce an unstretched film.

The unstretched film was introduced into a tenter (first tenter) in which a transverse stretching zone, an intermediate zone, and an intermediate heat treatment zone were continuously provided. In the intermediate zone, hot air from the transverse stretching zone and hot air from the intermediate heat treatment zone were blocked such that, when a strip-shaped paper piece was hung down in a state where a film was not passed through the intermediate zone, the paper piece hung down almost completely in the vertical direction.

The unstretched film introduced into the first tenter was subjected to a transverse stretching in the transverse stretching zone under the conditions of a temperature of 80° C. and a stretch ratio of 4.0 times. The film that had been subjected to the transverse stretching was passed through the intermediate zone (passing time=about 1.2 seconds), then introduced into the intermediate heat treatment zone, and relaxed by 10% by shortening a distance between the clips of the first tenter while being subjected to heat treatment at a temperature of 95° C. for 8 seconds to produce a transversely uniaxially-stretched film.

The transversely stretched film was introduced into a lengthwise stretching machine in which a plurality of rolls including low-speed and high-speed rolls is continuously disposed, preheated on a preheating roll until the temperature of the film reaches 90° C., and then stretched on the low-speed and high-speed rolls so that the stretch ratio was 2.8 times. Subsequently, the lengthwise stretched film was forcibly cooled by a cooling roll set at a surface temperature of 25° C.

Then, the cooled film was introduced into a tenter (second tenter) and relaxed by 10% in the transverse direction (corresponding to the width direction of the film) while being subjected to heat treatment in an atmosphere of 140°

C. for 10 seconds in the second tenter, followed by cooling. Both edge portions in the width direction of the resulting film were cut and removed to produce a polyester-based film with a thickness of about 20 μm.

The production conditions of the film are shown in Table 2.

[Films 2 to 8]

Polyester-based films 2 to 8 were produced in the same manner as in the film 1 except that the blending ratio of raw materials, the conditions for the first stretching, intermediate heat treatment, second stretching, and final heat treatment were variously changed. As to the film 8, in addition to changing the blending ratio of raw materials from the film 1, the first stretching was performed in the lengthwise direction, the second stretching was performed in the transverse direction, and relaxation treatment was performed in both the lengthwise and transverse directions in the final heat treatment. The production conditions of each film are shown in Table 2.

[Film 9]

As film 9, Pylen (registered trademark) Film-OT P5562-20 μm (biaxially stretched polypropylene film) manufactured by Toyobo Co., Ltd. was used. The film 9 is shown in Table 2 together with the films 1 to 8.

[Film 10]

As film 10, LIX (registered trademark) Film L4103-30 μm (non-stretched, linear low density polyethylene film) manufactured by Toyobo Co., Ltd. was used. The film 10 is shown in Table 2 together with the films 1 to 9.

TABLE 2

| | | Film 1 | Film 2 | Film 3 | Film 4 | Film 5 | Film 6 | Film 7 | Film 8 | Film 9 | Film 10 |
|---|---|---|---|---|---|---|---|---|---|---|---|
| Raw material composition for heat seal layer (mass %) | Polyester A | 10 | 10 | 0 | 25 | 0 | 5 | 95 | 20 | P5562 | L4103 |
| | Polyester B | 75 | 0 | 0 | 60 | 0 | 65 | 0 | 60 | | |
| | Polyester C | 0 | 0 | 95 | 0 | 0 | 0 | 0 | 0 | | |
| | Polyester D | 0 | 70 | 0 | 0 | 0 | 0 | 0 | 0 | | |
| | Polyester E | 10 | 15 | 0 | 10 | 0 | 25 | 0 | 15 | | |
| | Polyester F | 0 | 0 | 0 | 0 | 95 | 0 | 0 | 0 | | |
| | Polyester G | 5 | 5 | 5 | 5 | 5 | 5 | 5 | 5 | | |
| Amount of monomer component that may serve as amorphous components (mol %) | | 23.8 | 22.9 | 28.1 | 18.4 | 15.1 | 20.4 | 1.0 | 20.4 | | |
| First stretching | Stretching direction | Transverse | Transverse | Transverse | Transverse | Transverse | Transverse | Transverse | Lengthwise | | |
| | Stretching temperature (° C.) | 80 | 78 | 78 | 82 | 82 | 78 | 90 | 85 | | |
| | Stretch ratio | 4.0 | 4.2 | 4.2 | 3.8 | 3.8 | 4.2 | 3.8 | 3.5 | | |
| Intermediate heat treatment | Heating temperature (° C.) | 95 | 90 | 90 | 90 | 90 | 90 | 90 | No heating | | |
| | Relaxation direction | Transverse | Transverse | Transverse | Transverse | Transverse | Transverse | Transverse | — | | |
| | Relaxation ratio (%) | 10 | 5 | 6 | 6 | 5 | 10 | 0 | — | | |
| Second stretching | Stretching direction | Lengthwise | Lengthwise | Lengthwise | Lengthwise | Lengthwise | Lengthwise | Lengthwise | Transverse | | |
| | Stretching temperature (° C.) | 90 | 90 | 90 | 90 | 90 | 90 | 105 | 105 | | |
| | Stretch ratio | 2.8 | 2.8 | 2.6 | 2.4 | 2.4 | 2.4 | 3.3 | 4.0 | | |
| Final heat treatment | Temperature (° C.) | 140 | 135 | 145 | 140 | 160 | 140 | 220 | 140 | | |
| | Relaxation ratio in the longitudinal direction (%) | 0 | 0 | 0 | 0 | 0 | 0 | 0 | 5 | | |
| | Relaxation ratio in the width direction (%) | 10 | 15 | 18 | 17 | 17 | 17 | 3 | 3 | | |
| Thickness of the film (μm) | | 20 | 9 | 12 | 12 | 30 | 55 | 12 | 13 | 20 | 30 |

Example 1

A packaging bag was produced using the film 1 according to the method below.

<Method for Producing the Packaging Bag>

The film was half-folded so that a crease was along the flow direction of the film, and the half-folded film was set in a side-welding machine (PP500 type side welder manufactured by Kyoei Co., Ltd.). A side-welded packaging bag was produced by side-welding the film under the conditions of a blade angle of 90°, a temperature of the blade of 410° C. and a number of shots of 140 bags/min. The packaging bag has a size of 310 mm in a direction along a side-welded line (corresponding to the width direction of the film roll)×220 mm in a direction orthogonal to a side-welded line (corresponding to the flow direction of the film roll). (hereinafter, unless otherwise specified, a direction along a side-welded line is referred as "width direction", and a direction orthogonal to a side-welded line is referred as "flow direction").

Examples 2 to 6

The packaging bag was produced by changing the film in the same manner as in Example 1. The constituent and characteristics of the packaging bag in Examples 2 to 6 are summarized in Table 3.

Example 7

Film 3 and film 7 were laminated according to the method below. The packaging bag was produced using the laminate in the same manner as in Example 1. The constituent and characteristics of the packaging bag in Example 7 are summarized in Table 3.

<Method for Producing the Laminate>

The roll of film 3 was unrolled, and one side of the film 3 was adhered to film 7 using an adhesive for dry-lamination (Takelac™ A-950 manufactured by Mitsui Chemicals, Inc.) to produce a laminated film consisting of two layers of film 3 (12 μm)/film 7 (12 μm) in order from the inner layer of the packaging bag (a surface coming into contact with fruits and vegetables).

Example 8

The packaging bag was produced by changing the film in the same manner as in Example 1. The constituent and characteristics of the packaging bag in Examples 2 to 7 are summarized in Table 3.

Comparative Examples 1 to 4

The packaging bag was produced with the constituent shown in Table 3 in the same manner as in Example 1. In Comparative Example 2, a laminate by laminating film 6 for both an inner layer and an outer layer of the packaging bag, was used (the film having a 55 μm thick was made into two layers to make a film having 110 μm thick).

<Method for Evaluating the Packaging Bag>

Samples were randomly selected from the packaging bags produced by the above method, and each characteristics of the packaging bag was evaluated according to the methods below.

The constituent and characteristics of the packaging bag in Examples 1 to 8 and Comparative Examples 1 to 4 are summarized in Table 3.

TABLE 3

| Packaging bag | | | Ex. 1 | Ex. 2 | Ex. 3 | Ex. 4 | Ex. 5 | Ex. 6 | Ex. 7 | Ex. 8 | Co. 1 | Co. 2 | Co. 3 | Co. 4 | Reference |
|---|---|---|---|---|---|---|---|---|---|---|---|---|---|---|---|
| | Layer structure | | Single Film | Single Film | Single Film | Single Film | Single Film | Single Film | Laminate Film | Single Film | Single Film | Laminate Film | Single Film | Single Film | No packaging bag |
| | Used film | Inner | 1 | 2 | 3 | 4 | 5 | 6 | 3 | 8 | 7 | 6 | 9 | 10 | |
| | | Outer | | | | | | | Film 7 | | | Film 6 | | | |
| | Thickness (μm) | | 20 | 9 | 12 | 12 | 30 | 55 | 24 | 13 | 12 | 110 | 20 | 30 | |
| | $O_2$-transmission rate [cc/(m2·d·atm)] | | 167 | 798 | 271 | 266 | 108 | 72 | 92 | 255 | 103 | 43 | 608 | 1013 | — |
| | $CO_2$-transmission rate [cc/(m2·d·atm)] | | 783 | 4730 | 1289 | 1272 | 482 | 234 | 354 | 1167 | 490 | 105 | 5545 | 27210 | — |
| | Water vapor transmission rate [g/(m2·d)] | | 56 | 314 | 83 | 85 | 33 | 28 | 31 | 79 | 48 | 10 | 9 | 11 | — |
| | $CO_2$-transmission rate/ $O_2$-transmission rate | | 4.7 | 5.9 | 4.8 | 4.8 | 4.5 | 3.3 | 3.8 | 4.6 | 4.8 | 2.4 | 9.1 | 26.9 | — |
| | Side-welded sealing strength (N/15 mm) | | 19.2 | 5.8 | 14.4 | 13.3 | 23.4 | 55.6 | 18.8 | 15.6 | 2.3 | 68.8 | 7.8 | 6.1 | — |
| | Angle after folding the film (°) | | 51 | 28 | 43 | 16 | 54 | 68 | 60 | 48 | 120 | 95 | 90 | 135 | — |
| Tensile modulus (MPa) | Longitudinal direction | | 2980 | 2950 | 2930 | 2920 | 3090 | 3120 | 3950 | 2670 | 4960 | 3100 | 1600 | 160 | — |
| | Width direction | | 2870 | 2910 | 2850 | 2830 | 3010 | 3070 | 3540 | 3780 | 4220 | 3060 | 3320 | 180 | — |
| | Haze (%) | | 4.0 | 2.1 | 3.5 | 3.6 | 6.7 | 8.1 | 5.8 | 3.7 | 2.6 | 10.5 | 2.5 | 5.2 | — |
| | Gloss (%) | Inner | 175 | 170 | 170 | 172 | 175 | 171 | 170 | 170 | 170 | 170 | 127 | 118 | — |
| | | Outer | 174 | 170 | 170 | 170 | 174 | 170 | 165 | 171 | 165 | 170 | 128 | 117 | — |
| Hot-water heat shrinkage percentage at 80° C. (%) | Longitudinal direction | | 7.6 | 9.2 | 8.3 | 7.3 | 4.1 | 8.8 | 6.1 | 3.1 | 0.3 | 8.8 | 2.3 | 0.3 | — |
| | Width direction | | 4.3 | 6.7 | 5.1 | 3.6 | 2.8 | 7.4 | 3.3 | 6.8 | 0.1 | 7.5 | 3.1 | 0.1 | — |
| | Property of retaining the opening twisted | | ○ | ○ | ○ | ○ | ○ | ○ | ○ | ○ | X | X | X | X | — |

TABLE 3-continued

|  |  |  | Ex. 1 | Ex. 2 | Ex. 3 | Ex. 4 | Ex. 5 | Ex. 6 | Ex. 7 | Ex. 8 | Co. 1 | Co. 2 | Co. 3 | Co. 4 | Reference |
|---|---|---|---|---|---|---|---|---|---|---|---|---|---|---|---|
| Keeping-freshness property (Broccoli) | Color value change | L* | 0.0 | 1.2 | 0.1 | 0.2 | 0.0 | 0.0 | 0.0 | 0.0 | 0.1 | 0.0 | 4.7 | 6.9 | 12.1 |
|  |  | b* | 2.4 | 1.9 | 1.6 | 1.5 | 0.9 | 0.6 | 1.5 | 1.5 | 2.0 | 0.4 | 5.3 | 19.9 | 15.8 |
|  |  | Evaluation | ○ | ○ | ○ | ○ | ○ | ○ | ○ | ○ | ○ | ○ | Δ | X | X |
|  | Water droplets |  | ○ | ○ | ○ | ○ | ○ | ○ | ○ | ○ | ○ | X | X | X | — |
|  | Odor (Sensory) |  | ○ | ○ | ○ | ○ | ○ | ○ | ○ | ○ | ○ | X | ○ | ○ | — |

[Side-Welded Sealing Strength]

Total 40 samples with a size of width direction 15 mm×flow direction 100 mm were cut out from a part of the packaging bag that was side-welded (20 samples from each side of the packaging bag, one side 310 mm×2=both sides 620 mm). According to JIS Z1707, each sample was open with 1800, and the both sides of the open sample were set to a tensile testing machine (Autograph AG-Xplus manufactured by Shimadzu Corporation, inter-chuck distance: 50 mm). The tensile testing was carried out with a tensile rate of 200 mm/min in the flow direction of the sample, and a peeling strength was measured at which the side-welded part was broken. Maximum value of the peeling strength in each sample was determined as a side-welded sealing strength, and recorded as the strength per 15 mm (N/15 mm). Average value of the 40 samples was determined as an average value of the side-welded sealing strength.

[Water Vapor Transmission Rate]

Water vapor transmission rate was measured according to JIS K7126 B method. Sample (1 film) was cut out from a part of the packaging bag that was not side-welded (at least 20 mm away from the side-welded part), and a water vapor transmission rate was measured at a temperature of 40-C and a humidity of 90% RH using a water vapor transmission rate measuring device (PERMATRAN-W3/33MG manufactured by MOCON) by allowing humidity-controlling gas to permeate. Before the measurement, to control a humidity, the sample was left for 4 hours at a temperature of 23° C. and a humidity of 65% RH.

[$O_2$-Transmission Rate]

$O_2$-transmission rate was measured according to JIS K7126-2 method. Sample (1 film) was cut out from a part of the packaging bag that was not side-welded (at least 20 mm away from the side-welded part), and an $O_2$-transmission rate was measured at a temperature of 23° C. and a humidity of 65% RH using an $O_2$-transmission rate measuring device (OX-TRAN 2/20 manufactured by MOCON) by allowing oxygen to permeate. Before the measurement, to control a humidity, the sample was left for 4 hours at a temperature of 23° C. and a humidity of 65% RH.

[$CO_2$-Transmission Rate]

$CO_2$-transmission rate was measured according to JIS K7126-1 method (Differential pressure method, Gas chromatography). Sample (1 film) was cut out from a part of the packaging bag that was not side-welded (at least 20 mm away from the side-welded part), and a $CO_2$-transmission rate was measured at a temperature of 23° C. using a $CO_2$-transmission rate measuring device (GTR-10X manufactured by GTR Tec Co., Ltd.) by allowing carbon dioxide to permeate. Before the measurement, to control a humidity, the sample was left for 4 hours at a temperature of 23-C and a humidity of 65% RH.

[Angle after Folding the Film]

Figure 1:
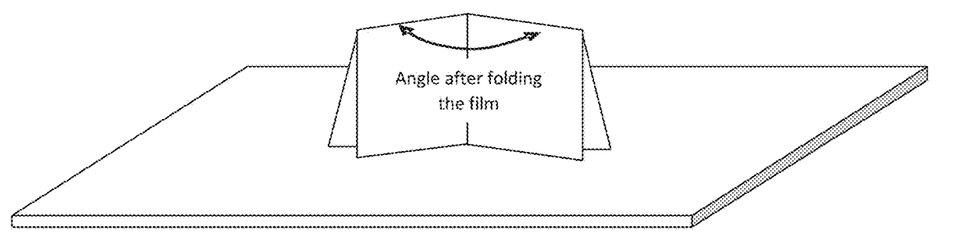
FIG. 1 shows a schematic diagram of the measurement method of angle after folding the film.

Sample (1 film) was cut out from a part of the packaging bag that was not side-welded (at least 20 mm away from the side-welded part), and was left for 24 hours in a constant temperature room controlled at 28° C. and 50% RH. Thereafter, immediately, under the environment controlled at 20° C. and 65% RH, the sample was cut to give a 10 cm×10 cm square sample, and folded in four (5 cm×5 cm square). When folding the square sample, a short side of the rectangle formed by a first folding in half is made to be the longitudinal direction, and the inside of the packaging bag is made to be a mountain fold. After that, the ¼-fold sample was sandwiched between two glasses having a size of 10 cm×15 cm and a thickness of 2 mm, a weight (5 kg) was placed on the glass, and pressed for 10 seconds. After removing the weight from the ¼-fold sample, an angle formed by the sample opening was measured on the basis of a last crease as a standard line according to FIG. 1. The state where the sample was completely folded was determined as 0°, and the state where the sample was fully open was determined as 1800.

[Tensile Modulus]

Tensile modulus was measured according to JIS K7113. Sample (1 film) with a rectangular shape having a size of a direction to measure (the longitudinal direction or the width direction of the film) 140 mm and a direction orthogonal to the direction to measure 20 mm was cut out from a part of the packaging bag that was not side-welded (at least 20 mm away from the side-welded part). Using a tensile testing machine (Autograph AG-Xplus manufactured by Shimadzu Corporation), the both sides of the sample were gripped with chucks by 20 mm on each side (inter-chuck distance: 100 mm). The tensile testing was carried out at a temperature of 23° C. with a tensile rate of 200 mm/min, and a slope of the strength (stress) at the start of the tensile testing was determined as a tensile modulus (MPa). The measurement was carried out twice, and the average value was calculated.

[Haze]

Haze was measured according to JIS K7136. Sample (1 film) was cut out from a part of the packaging bag that was not side-welded (at least 20 mm away from the side-welded part), and measurement was carried out using a haze meter (300A manufactured by Nippon Denshoku Industries Co., Ltd.). The measurement was carried out twice, and the average value was calculated.

[Gloss]

Gloss was measured according to JIS K8741. Sample (1 film) was cut out from a part of the packaging bag that was not side-welded (at least 20 mm away from the side-welded part), and measurement was carried out at an angle of 45° using a gloss meter (VG2000 manufactured by Nippon Denshoku Industries Co., Ltd.).

[Hot-Water Heat Shrinkage Percentage]

Sample (1 film) from a part of the packaging bag that was not side-welded (at least 20 mm away from the side-welded part) was cut to give a 10 cm×10 cm square sample. The square sample was immersed in hot water of 80±0.5° C. for 3 minutes under no load inducing heat shrinkage, thereafter in water of 25° C.±0.5° C. for 10 seconds, and then taken out from water. Subsequently, a size of the sample in the longitudinal direction and in the width direction was determined, and the heat shrinkage percentage was calculated according to the following Equation 1. The measurement was carried out twice, and the average value was calculated.

Shrinkage percentage={(Length before shrinkage–Length after shrinkage)/Length before shrinkage}×100(%)  Equation 1

[Property of Retaining the Opening Twisted]

The part about 10 cm from the opening in the packaging bag was twisted by hand twice (7200), left for 1 minute, and the degree of returning of the twisted part was evaluated. The twist retaining property was evaluated according to the following criteria.
  ○: The twisted state was retained (returned angle: lower than 4500).
  x: The twisted part was unraveled and not retained (returned angle: 4500 or more).

[Keeping-Freshness Property]

Broccoli was placed in a packaging bag and allowed to stand for 3 days at a temperature of 30° C. and a humidity of 85% RH. Then, the keeping-freshness property was evaluated with the color value change and the odor. The detailed method is shown below.

First, one bunch (about 5 cm) of flower buds was cut from a commercially available broccoli, and the L* value and the b* value of the top of the flower buds were measured with a color meter (ZE6000 manufactured by Nippon Denshoku Industries Co., Ltd.) by reflection method. When measuring the color values, a highly transparent polyester film A4100-25 μm (color L* value: 93.7, b* value: 0.07) manufactured by Toyobo Co., Ltd. was laid on a measurement section of the color meter, and the broccoli was placed thereon. The color L* value and b* value were measured three times, and the each average value was calculated.

Next, the broccoli whose color L* value and b* value had been measured was placed in a packaging bag, and the opening of the packaging bag was heat-sealed with a desk-top sealer (HAKKO No. 310-1 manufactured by Hakko Corporation). At this time, the scale of the sealer was set to 6, and after sealed twice (seal interval within 3 seconds), the film was cut at a position 3 mm outside (on the side where the broccoli was not placed) from the sealed portion.

The packaging bag in which the broccoli was enclosed by the above method was placed in a thermo-hygrostat (LHU124 manufactured by ESPEC Corp.) set at a temperature of 30-C and a humidity of 85% RH, and allowed to stand for 3 days. After that, the broccoli was taken out from the packaging bag and the color values were measured. The method of measuring the color values was the same as the method before the broccoli was allowed to stand. For each of the color L* value and b* value, the color value change after allowing to stand was calculated by the following Equation 2:

Color value change=(color value after allowing to stand)−(color value before allowing to stand)  Equation 2

The color value change was evaluated according to the following criteria.
  ○: Both of the color L* value and b* value changes were 5 or less.
  Δ: Change in any one of the color L* value and b* value was 5 or less.
  x: Both of the color L* value and b* value changes were more than 5.

Water droplets adhering to the inner surface (surface in contact with fruits and vegetables) of the packaging bag after the broccoli was allowed to stand were visually evaluated according to the following criteria.
  ○: Water droplets did not adhere to the inner surface of the packaging bag (less than ⅕ of the area of the packaging bag).
  x: Water droplets adhered to the inner surface of the packaging bag (⅕ or more of the area of the packaging bag).

Furthermore, the odor when the broccoli was allowed to stand and then taken out from the packaging bag was evaluated according to the following criteria.
  ○: There was no odor when the packaging bag was opened.
  x: There was an odor (pickle odor) when the packaging bag was opened.

Note that, in the evaluation of keeping-freshness property in Table 3, "no packaging bag" in which broccoli was not packaged is also described as a reference example. In this case, only the color L* values and b* values before and after the broccoli was allowed to stand were evaluated.

[Evaluation Results of the Film]

From Table 3, all of the packaging bags in Examples 1 to 8 had good characteristics, thus good evaluation results were obtained.

Conversely, the packaging bag in Comparative Example 1 had a high angle after folding the film, therefore it had a low suitability as a packaging bag. Additionally, the side-welded sealing strength was extremely low.

The packaging bag in Comparative Example 2 had an extremely low $O_2$-transmission rate and $CO_2$-transmission rate, therefore, it had a poor keeping-freshness property since the odor was felt when opening the packaging bag after the broccoli was left. Additionally, the packaging bag in Comparative Example 2 had a high angle after folding the film, therefore it had a low suitability as a packaging bag. The haze was also high.

The packaging bag in Comparative Example 3 had a high $CO_2$-transmission rate and a low water vapor transmission rate, therefore it had a poor keeping-freshness property. The ratio of the $CO_2$-transmission rate and the $O_2$-transmission rate was also high. Additionally, the packaging bag in Comparative Example 3 had a high angle after folding the film, therefore it had a low suitability as a packaging bag. The gloss was also low.

The packaging bag in Comparative Example 4 had a high $O_2$-transmission rate, a high $CO_2$-transmission rate, and a low water vapor transmission rate, therefore it had a poor keeping-freshness property. The ratio of the $CO_2$-transmission rate and the $O_2$-transmission rate was also high. Additionally, the packaging bag in Comparative Example 4 had a high angle after folding the film, therefore it had a low suitability as a packaging bag. The tensile modulus and the gloss were also low.

INDUSTRIAL APPLICABILITY

The polyester-based film for keeping freshness of the present invention has a low $O_2$-transmission rate transmission rate, a low $CO_2$-transmission rate, and a water vapor transmission rate within a predetermined range, thereby the film has a high dead-fold property. Therefore, when using as a packaging bag, the opening can be re-closed by simply twisting or folding the opening, and further the films can contribute to extending a shelf life of the contents such as fruits and vegetables and increasing a commodity value.

The invention claimed is:

1. A polyester-based film for keeping freshness, consisting of a polyester-based resin composition consisting of:
(i) a polyester-based resin consisting of (a) an ethylene terephthalate unit and (b) one or more amorphous units having an amorphous monomer component and
(ii) one or more additives selected from a wax, an antioxidant, an antistatic agent, a crystal nucleating agent, a viscosity reducing agent, a thermal stabilizer, a coloring pigment, an anti-coloring agent, and a lubricant,
wherein the polyester-based film has no pores and satisfies the requirements (1) to (4):
(1) the film has an $O_2$-transmission rate of 72 [cc/($m^2 \cdot d \cdot atm$)] or more and 1000 [cc/($m^2 \cdot d \cdot atm$)] or less when measured at a temperature of 23° C. and a relative humidity of 65% RH,
(2) the film has a $CO_2$-transmission rate of 200 [cc/($m^2 \cdot d \cdot atm$)] or more and 5000 [cc/($m^2 \cdot d \cdot atm$)] or less when measured at a temperature of 23° C.,
(3) the film has a water vapor transmission rate of 20 [g/($m^2 \cdot d$)] or more and 400 [g/($m^2 \cdot d$)] or less when measured at a temperature of 40° C. and a relative humidity of 90% RH, and
(4) the film has an angle after folding the film of 20° or more and 80° or less.

2. The polyester-based film for keeping freshness according to claim 1, wherein the film has a ratio of the $CO_2$-transmission rate measured at a temperature of 23° C. and the $O_2$-transmission rate measured at a temperature of 23° C. and a relative humidity of 65% RH ($CO_2$-transmission rate/$O_2$-transmission rate) of 2 or more and 8 or less.

3. The polyester-based film for keeping freshness according to claim 2, wherein the film has a side-welded sealing strength of 5 N/15 mm or more and 60 N/15 mm or less.

4. The polyester-based film for keeping freshness according to claim 3, wherein the film has a tensile modulus of 2000 MPa or more and 4500 MPa or less in the longitudinal direction or in the width direction.

5. The polyester-based film for keeping freshness according to claim 4, wherein a thickness is 3 μm or more and 70 μm or less.

6. The polyester-based film for keeping freshness according to claim 5, wherein a total amount of the amorphous monomer component monomer components is 12 mol % or more and 30 mol % or less among total monomer components contained in the polyester-based resin.

7. A laminate, comprising one or more the polyester-based films for keeping freshness according to claim 6.

8. A packaging bag, comprising the polyester-based film for keeping freshness according to claim 6.

9. A lid, comprising the polyester-based film for keeping freshness according to claim 6.

10. The polyester-based film for keeping freshness according to claim 6, wherein the amorphous monomer component is one, two, or three of isophthalic acid, neopentyl glycol, 1,4-cyclohexane dimethanol, and diethylene glycol.

11. The polyester-based film for keeping freshness according to claim 1, wherein the film has a side-welded sealing strength of 5 N/15 mm or more and 60 N/15 mm or less.

12. The polyester-based film for keeping freshness according to claim 1, wherein the film has a tensile modulus of 2000 MPa or more and 4500 MPa or less in the longitudinal direction or in the width direction.

13. The polyester-based film for keeping freshness according to claim 1, wherein a thickness is 3 μm or more and 70 μm or less.

14. The polyester-based film for keeping freshness according to claim 1, wherein
a total amount of the amorphous monomer component is 12 mol % or more and 30 mol % or less among total monomer components contained in the polyester-based resin.

15. A laminate, comprising one or more the polyester-based films for keeping freshness according to claim 1.

16. A packaging bag, comprising the laminate according to claim 15.

17. A lid, comprising the laminate according to claim 15.

18. A packaging bag, comprising the polyester-based film for keeping freshness according to claim 1.

19. A lid, comprising the polyester-based film for keeping freshness according to claim 1.

20. The polyester-based film for keeping freshness according to claim 1, wherein the polyester-based resin does not contain an aliphatic dicarboxylic acid unit.

* * * * *

UNITED STATES PATENT AND TRADEMARK OFFICE
CERTIFICATE OF CORRECTION

| | | |
|---|---|---|
| PATENT NO. | : 12,030,288 B2 | Page 1 of 1 |
| APPLICATION NO. | : 15/734978 | |
| DATED | : July 9, 2024 | |
| INVENTOR(S) | : Shintaro Ishimaru et al. | |

It is certified that error appears in the above-identified patent and that said Letters Patent is hereby corrected as shown below:

On the Title Page

Item (57) In the abstract, at Line 3, delete the "," after "comprising"

In the Claims

In Claim 6, at Column 26, Line 2, delete "monomer components"

Signed and Sealed this
Eighth Day of October, 2024

Katherine Kelly Vidal
*Director of the United States Patent and Trademark Office*